US010939015B2

(12) United States Patent
Galanida

(10) Patent No.: US 10,939,015 B2
(45) Date of Patent: Mar. 2, 2021

(54) IMAGE PROCESSING APPARATUS INSERTING IMAGE INTO INSERTION AREA, AND IMAGE FORMING APPARATUS

(71) Applicant: KYOCERA Document Solutions Inc., Osaka (JP)

(72) Inventor: Gerald Galanida, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/414,302

(22) Filed: May 16, 2019

(65) Prior Publication Data

US 2019/0364170 A1 Nov. 28, 2019

(30) Foreign Application Priority Data

May 25, 2018 (JP) .............................. JP2018-100726

(51) Int. Cl.
*H04N 1/00* (2006.01)
*H04N 1/393* (2006.01)
*H04N 1/40* (2006.01)
*H04N 1/387* (2006.01)

(52) U.S. Cl.
CPC ......... *H04N 1/393* (2013.01); *H04N 1/00795* (2013.01); *H04N 1/3877* (2013.01); *H04N 1/40012* (2013.01); *H04N 2201/0094* (2013.01)

(58) Field of Classification Search
CPC ..................................................... H04N 1/387
See application file for complete search history.

(56) References Cited

U.S. PATENT DOCUMENTS

| 6,385,348 | B1* | 5/2002 | Harada | .................. | G06K 15/02 |
| | | | | | 358/450 |
| 2005/0157343 | A1* | 7/2005 | Tani | ........................ | G06F 16/51 |
| | | | | | 358/1.18 |
| 2005/0213848 | A1 | 9/2005 | Fan et al. | | |
| 2005/0281536 | A1* | 12/2005 | Aiso | ....................... | G06T 11/60 |
| | | | | | 386/248 |

(Continued)

FOREIGN PATENT DOCUMENTS

JP 2012-205114 A 10/2012

OTHER PUBLICATIONS

The first office action in CN mailed by SIPO (State Intellectual Property office) dated Sep. 25, 2020 in the corresponding Chinese Patent Application No. 201910417436.3.

*Primary Examiner* — Benjamin O Dulaney
(74) *Attorney, Agent, or Firm* — IP Business Solutions, LLC

(57) ABSTRACT

An image processing apparatus includes an image input unit and a control unit. Through the image input unit, a first image including an insertion area and a second image different from the first image are input. The control unit functions as an image acquisition section, an insertion area detection section, an insertion image detection section, and an image processing section. The image acquisition section acquires the first image and the second image input through the image input unit. The insertion area detection section detects the insertion area from the first image. The insertion image detection section detects an insertion image from the second image. The image processing section generates a third image by inserting the insertion image into the insertion area.

7 Claims, 13 Drawing Sheets

(56) References Cited

U.S. PATENT DOCUMENTS

| | | | |
|---|---|---|---|
| 2007/0081179 A1* | 4/2007 | Nishida | G06K 9/00469 |
| | | | 358/1.11 |
| 2007/0211295 A1* | 9/2007 | Hosoi | H04N 1/387 |
| | | | 358/1.18 |
| 2007/0242882 A1* | 10/2007 | Chiba | G06K 9/2063 |
| | | | 382/173 |
| 2009/0254813 A1* | 10/2009 | Kobayashi | H04N 1/387 |
| | | | 715/243 |
| 2010/0238506 A1* | 9/2010 | Murakami | G06F 16/93 |
| | | | 358/1.16 |
| 2011/0227951 A1* | 9/2011 | Kubo | H04L 12/1827 |
| | | | 345/667 |
| 2013/0238724 A1* | 9/2013 | Cunningham | G06F 3/04842 |
| | | | 709/206 |
| 2014/0071462 A1* | 3/2014 | Ono | H04N 1/00681 |
| | | | 358/1.5 |
| 2014/0078545 A1* | 3/2014 | Hasegawa | G06F 16/00 |
| | | | 358/1.15 |
| 2018/0061263 A1* | 3/2018 | Nishihara | G06F 40/174 |
| 2019/0250866 A1* | 8/2019 | Arakawa | G06F 3/1203 |

\* cited by examiner

IMAGE PROCESSING APPARATUS INSERTING IMAGE INTO INSERTION AREA, AND IMAGE FORMING APPARATUS

INCORPORATION BY REFERENCE

This application claims priority to Japanese Patent Application No. 2018-100726 filed on May 25, 2018, the entire contents of which are incorporated by reference herein.

BACKGROUND

The present disclosure relates to an image processing apparatus and an image forming apparatus, and particularly to a technique for creating an image.

Techniques for performing image processing of changing acquired images into images desired by users are known in image processing apparatuses or the like.

For example, there is known a technique for extracting an object image including an instructed object from images sequentially acquired by an image capturing device, and combining the extracted object image with the sequentially acquired images, thereby sequentially generating combined images.

SUMMARY

As an aspect of the present disclosure, a technique obtained by further improving the above-described technique is proposed.

An image processing apparatus according to an aspect of the present disclosure includes an image input unit and a control unit. Through the image input unit, a first image including an insertion area representing a position for inserting an image and a second image different from the first image are input. The control unit includes a processor and functions, when the processor executes a control program, as an image acquisition section, an insertion area detection section, an insertion image detection section, and an image processing section. The image acquisition section acquires the first image and the second image input through the image input unit. The insertion area detection section detects the insertion area from the first image acquired by the image acquisition section. The insertion image detection section detects, from the second image acquired by the image acquisition section, an insertion image to be inserted into the insertion area. The image processing section generates a third image by inserting the insertion image detected by the insertion image detection section into the insertion area detected by the insertion area detection section.

An image forming apparatus according to another aspect of the present disclosure includes the above-described image processing apparatus and an image forming unit. The image forming unit forms the third image on a recording medium.

DETAILED DESCRIPTION

Figure 1:
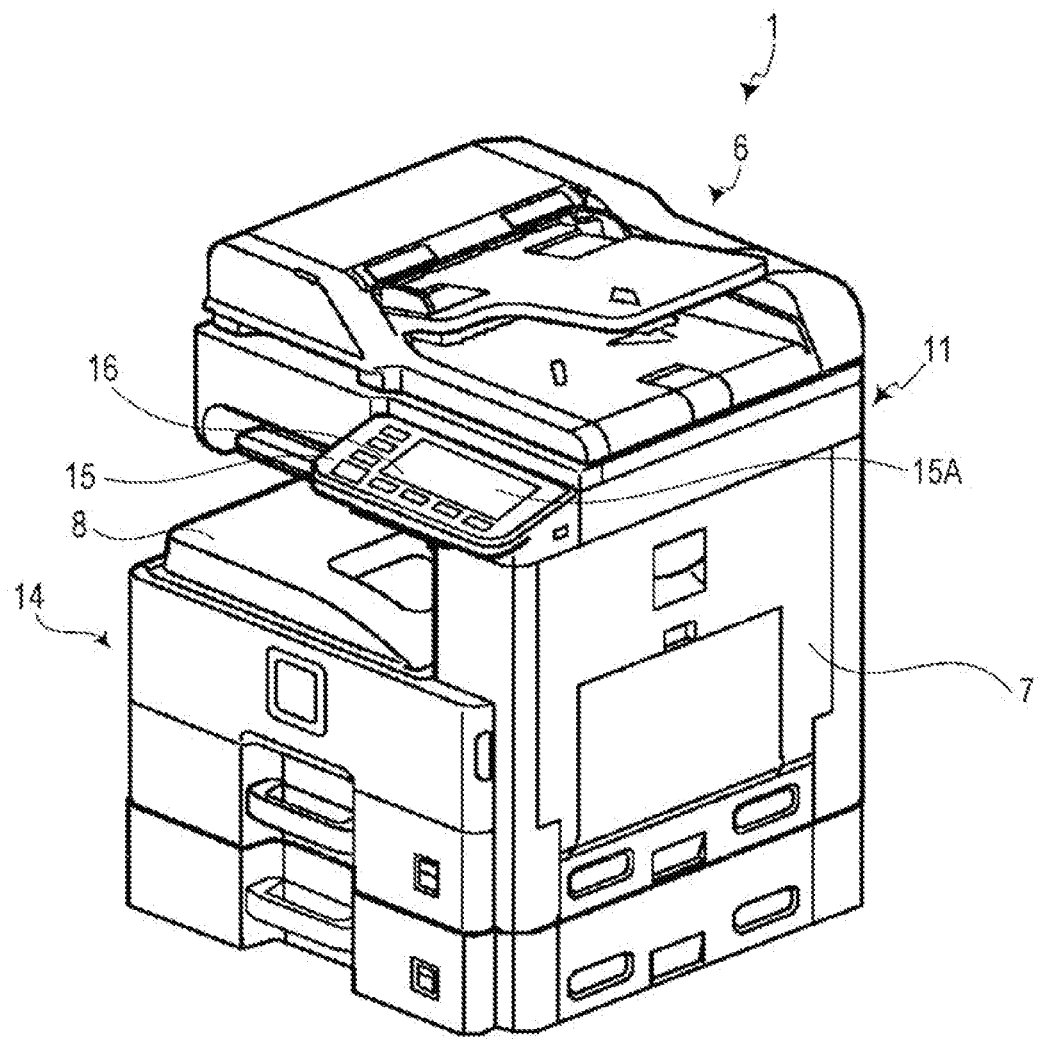
FIG. 1 is a perspective view illustrating an appearance of an image forming apparatus including an image processing apparatus according to an embodiment of the present disclosure.

An image forming apparatus according to an embodiment of the present disclosure will be described below with reference to the drawings. FIG. 1 is a perspective view illustrating an appearance of the image forming apparatus including an image processing apparatus according to an embodiment of the present disclosure. In the following description, "image" indicates "image data".

An image forming apparatus 1 is a multi-function peripheral having a plurality of functions such as a facsimile function, a copy function, a printer function, and a scanner function. In the present embodiment, the image forming apparatus 1 has a function that when a first image including an insertion area indicating a position for inserting an image and a second image different from the first image are acquired, generates a third image by inserting an insertion image detected from the second image into the insertion area detected from the first image (hereinafter the function is referred to as "image insertion processing").

Referring to FIG. 1, a housing 7 of the image forming apparatus 1 accommodates a plurality of devices for implementing various functions of the image forming apparatus 1. For example, the housing 7 accommodates, for example, an image reading unit 11, an image forming unit 12 (not illustrated in FIG. 1), a fixing unit 13 (not illustrated in FIG. 1), a sheet feeding unit 14.

The image reading unit 11 is an auto document feeder (ADF) including a document conveyance unit 6 that conveys a document, and a scanner that optically scans the document conveyed by the document conveyance unit 6, or a document placed on a contact glass which is not illustrated. The image reading unit 11 irradiates the document with light by a light irradiation unit, and by receiving the reflected light a charge-coupled device (CCD) sensor to read the document, thereby generating an image. The image reading unit 11 is an example of an image input unit described in the claims.

The image forming unit 12 includes a photosensitive drum, a charging device, an exposure device, a development device, and a transfer device. The image forming unit 12 forms a toner image on recording paper supplied from the sheet feeding unit 14 based on, for example, images generated by the image reading unit 11, or images sent from a personal computer and another device such as a facsimile device which are connected via a network.

The fixing unit 13 heats and pressurizes the recording paper on which the toner image has been formed by the image forming processing performed by the image forming unit 12, thereby fixing the toner image on the recording paper. After the toner image is fixed by the fixing unit 13, the recording paper on which the image has been formed is discharged onto a discharge tray 8.

The sheet feeding unit 14 draws out, one by one, recording paper accommodated in a sheet cassette, or recording paper placed on a manual feed tray by a pick-up roller, and delivers the recording paper to the image forming unit 12.

The image forming apparatus 1 includes an operation unit 15 that is located near the image reading unit 11 and on the front side of the image forming apparatus 1. A user inputs, through the operation unit 15, instructions or the like for various functions, which can be executed by the image forming apparatus 1. The operation unit 15 includes a display 16. The display 16 is a display device including a liquid crystal display. The display 16 displays various screens for various functions that can be executed by the image forming apparatus 1. The operation unit 15 includes a touch panel 15A disposed as to overlap the display 16. The touch panel 15A detects user's operation performed by various operation methods such as a touch operation and a drag operation.

Figure 2:
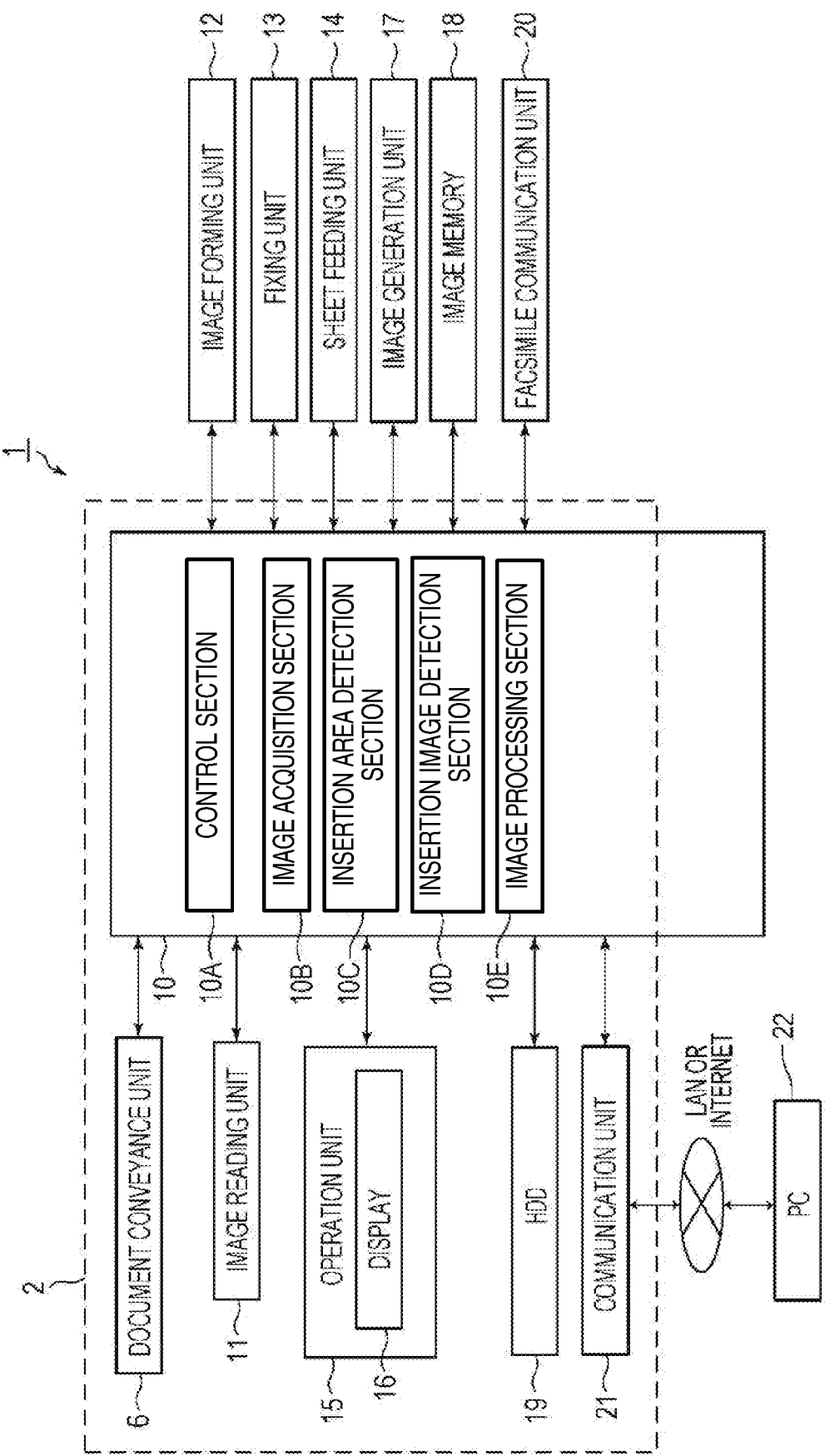
FIG. 2 is a block diagram illustrating an internal configuration of the image forming apparatus including the image processing apparatus according to the embodiment of the present disclosure.

FIG. 2 is a block diagram illustrating an internal configuration of the image forming apparatus including the image processing apparatus according to the embodiment of the present disclosure. Referring to FIG. 2, the image forming apparatus 1 includes a control unit 10. The control unit 10 includes, for example, a processor, a random access memory (RAM), and a read only memory (ROM). The processor is, for example, a central processing unit (CPU), a micro processing unit (MPU), or an application specific integrated circuit (ASIC). When the above-described processor executes a control program stored in a built-in ROM or hard disk drive (HDD) 19, the control unit 10 functions as a control section 10A, an image acquisition section 10B, an insertion area detection section 10C, an insertion image detection section 10D, and an image processing section 10E.

The control unit 10 is electrically connected to each of the document conveyance unit 6, the image reading unit 11, the image forming unit 12, the fixing unit 13, the sheet feeding unit 14, the operation unit 15, an image generation unit 17, an image memory 18, the HDD 19, a facsimile communication unit 20, and a communication unit 21. In the present embodiment, the document conveyance unit 6, the image reading unit 11, the operation unit 15, the display 16, the communication unit 21, and the control unit 10 function as an image processing apparatus 2 for implementing image insertion processing.

The control section 10A controls the entirety of the image forming apparatus 1. More specifically, the control section 10A executes processing such as the operation of each unit of the image forming apparatus 1 and communication with an information processing apparatus, such as a personal computer (PC) 22, which is connected thereto via a network.

The image generation unit 17 executes image processing, as needed, on the image generated by the image reading unit 11, and generates an image on which the image processing has been performed.

The image memory 18 includes an area for temporarily storing an image to be printed that is generated by the image reading unit 11.

The HDD 19 is a large-capacity storage device that stores various data including the image generated by the image reading unit 11. The HDD 19 stores various computer programs for implementing general operations of the image forming apparatus 1.

The HDD 19 also stores a control program for executing the image insertion processing according to the present embodiment. The above-described processor operates based on the control program, thereby executing as the control section 10A, the image acquisition section 10B, the insertion area detection section 10C, the insertion image detection section 10D, and the image processing section 10E, the image insertion processing according to the present embodiment. The image insertion processing is not limited to the operation based on the computer program, but instead may be operable by a hardware circuit.

The facsimile communication unit 20 connects to a public line and transmits and receives images via the public line.

The communication unit 21 includes a communication module such as a local area network (LAN) board. The image forming apparatus 1 performs data communication with the information processing apparatus on the network, such as the personal computer 22, through the communication unit 21. The communication unit 21 is an example of the image input unit described in the claims.

A power supply is connected to each unit of the image forming apparatus 1. Each unit of the image forming apparatus 1 operates when power is supplied to each unit of the image forming apparatus 1 from the power supply.

[Operation]

Figure 3:
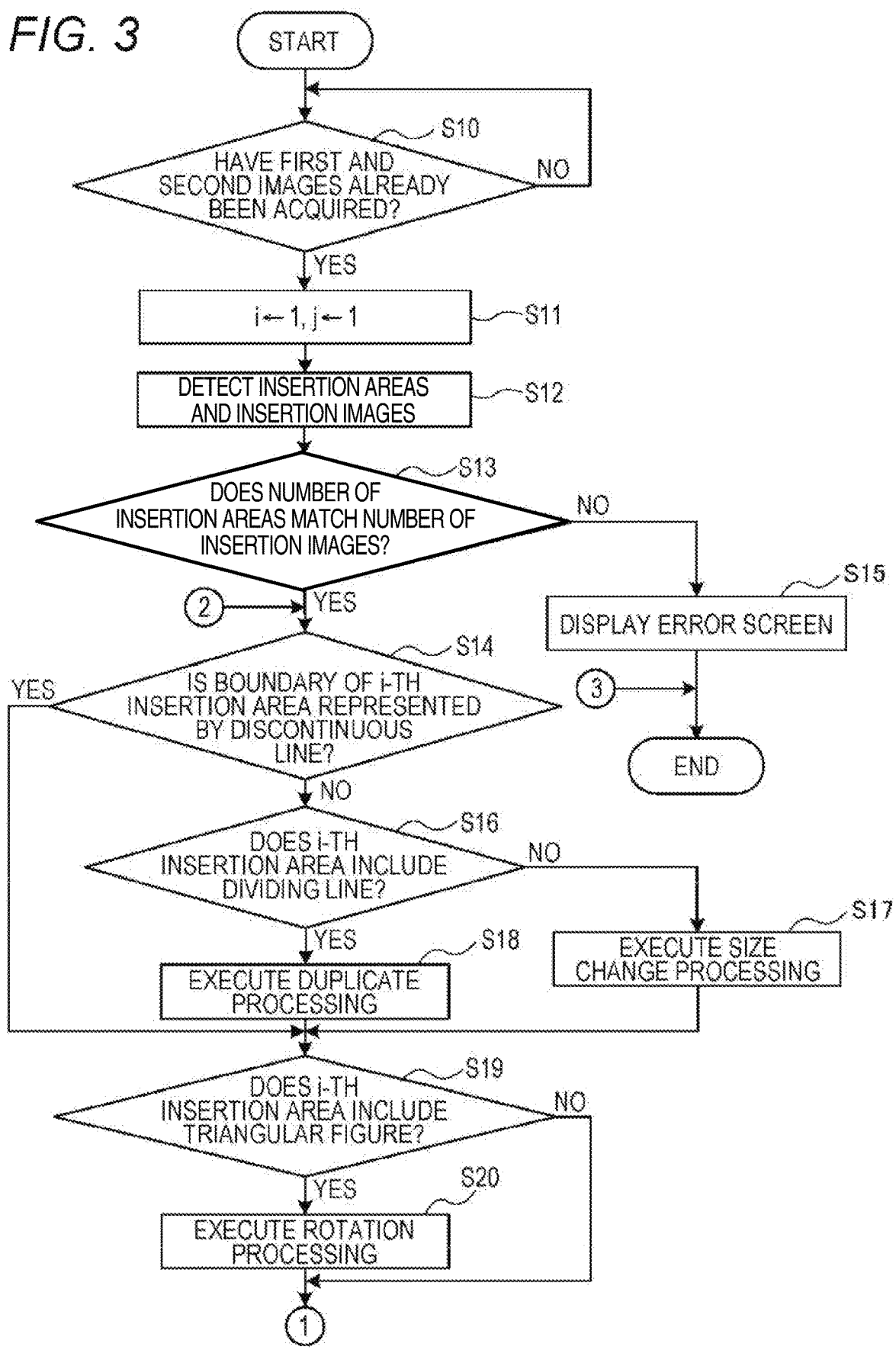
FIG. 3 is a flowchart illustrating image insertion processing.
Figure 4:
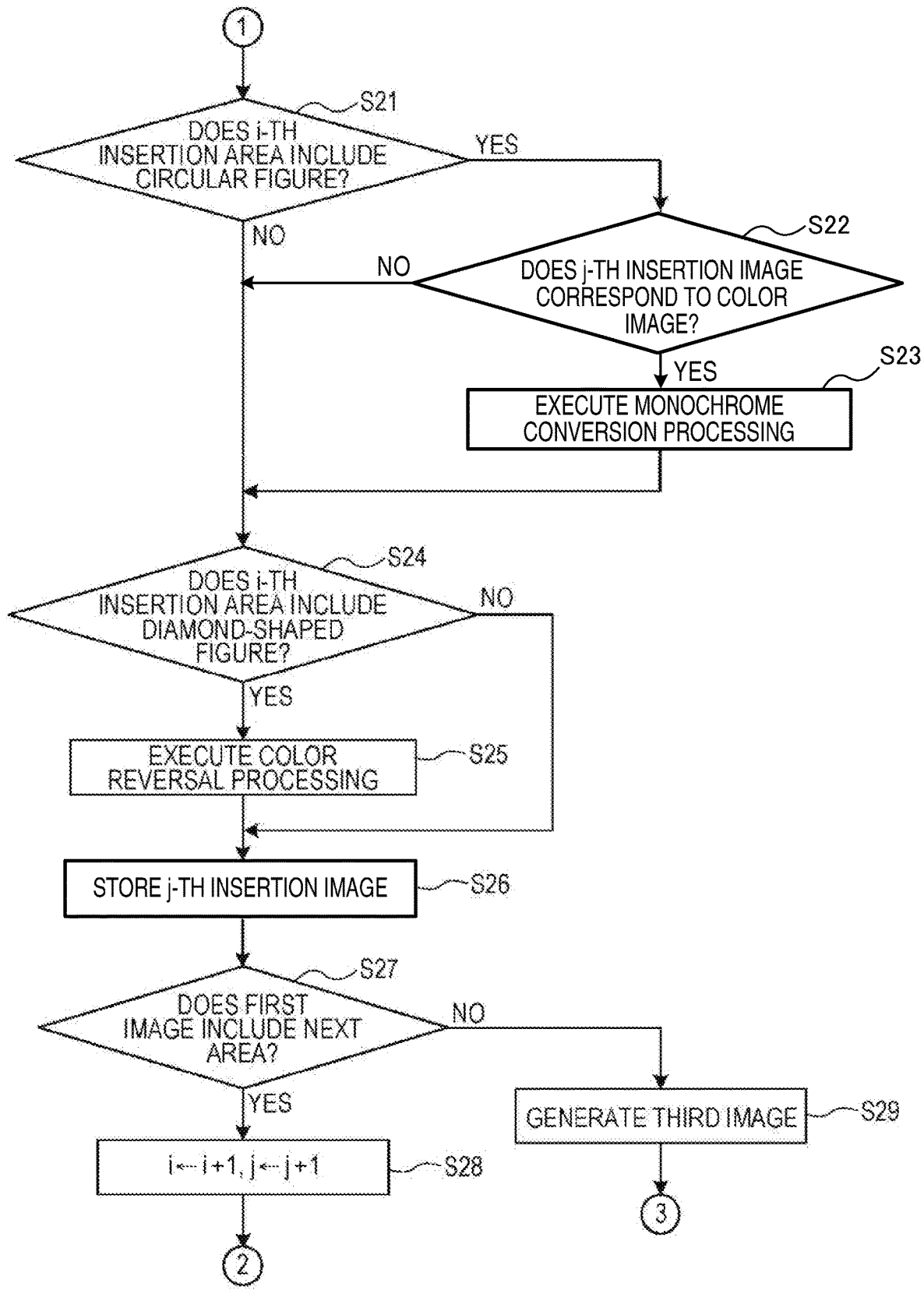
FIG. 4 is a flowchart illustrating the image insertion processing.

FIGS. 3 and 4 are flowcharts each illustrating the image insertion processing. A control structure of a control program for executing the image insertion processing and the operation of the image forming apparatus 1 will be described below. This control program is executed in such a manner that the user selects an image insertion function by inputting an instruction through the operation unit 15.

Figure 5:
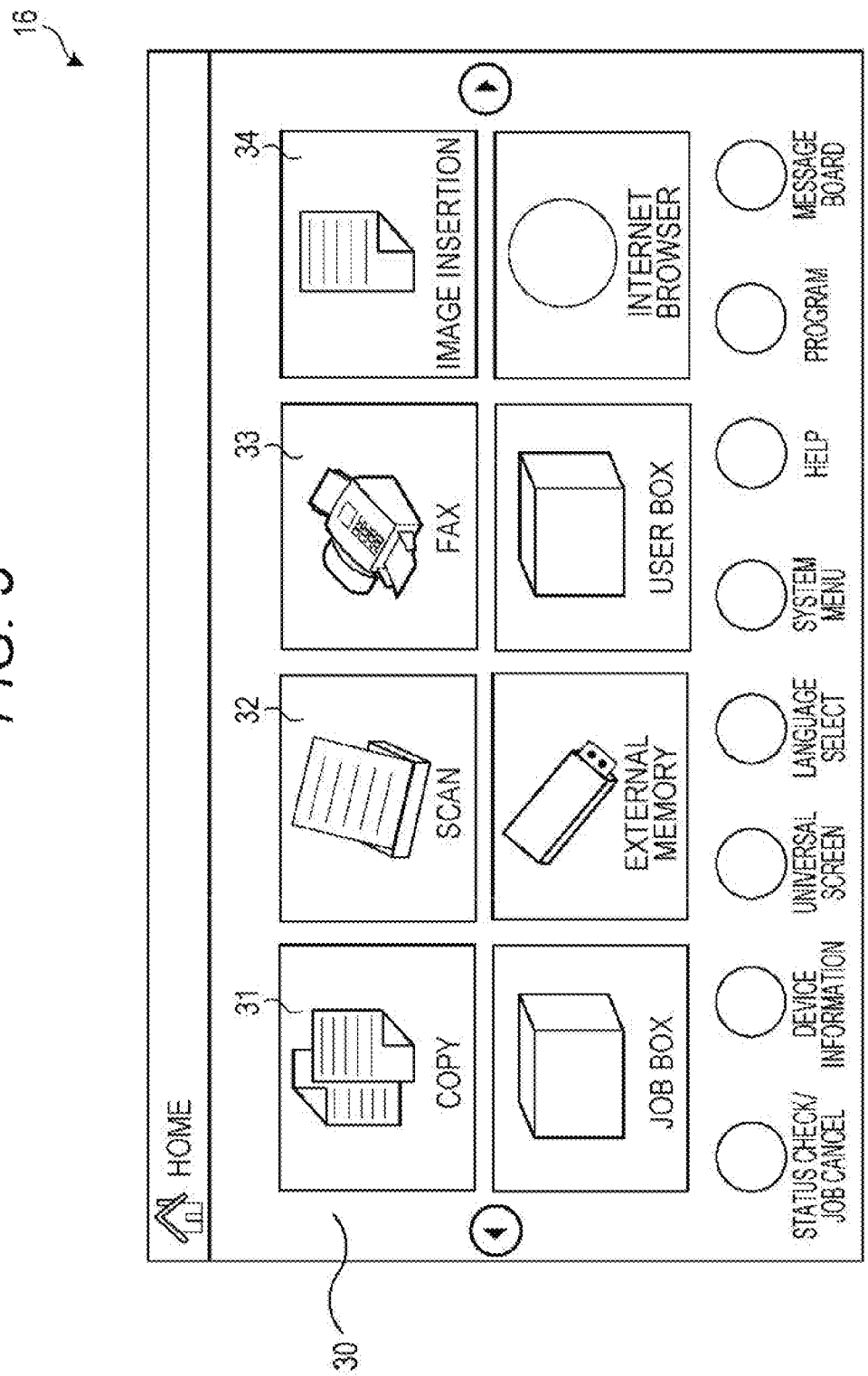
FIG. 5 illustrates an example of a home screen.

When the image forming apparatus 1 is powered on, the control section 10A causes the display 16 to display a home screen for selecting any one of a plurality of functions that can be executed by the image forming apparatus 1. FIG. 5 illustrates an example of the home screen. Referring to FIG. 5, a home screen 30 includes, as software keys, a key 31 for selecting the copy function, a key 32 for selecting the scanner function, a key 33 for selecting the facsimile function, and a key 34 for selecting the image insertion function.

(1) In the case of acquiring the first and second images through a reading operation by the image reading unit 11, the user first presses the key 32, thereby making the scanner function available. The user places a first document on, for example, the contact glass of the image reading unit 11, and inputs a document reading instruction through the operation unit 15.

Figure 6:
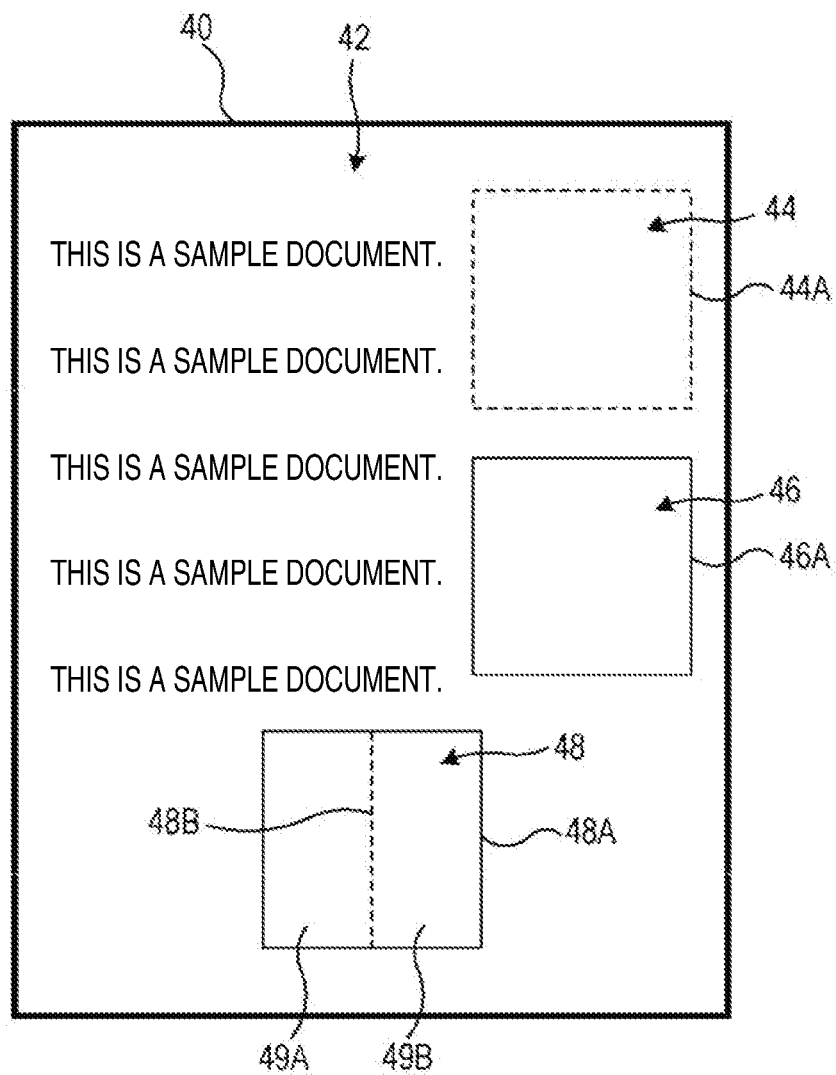
FIG. 6 illustrates an example of a first image.

FIG. 6 illustrates an example of the first image. Referring to FIG. 6, a first image 42 is image data generated based on a first document 40. The data structure of the first image 42 will be described below using the first document 40. The first image 42 includes insertion areas 44, 46, and 48 in that order from one end side in a first predetermined direction toward the other end side in the first direction. The insertion area 44, the insertion area 46, and the insertion area 48 are rectangular areas each representing a position where an image is inserted.

In the present embodiment, the image processing section 10E executes, as the image insertion processing, image processing on the insertion areas 44, 46, and 48 in order from the insertion area located at one end side in the first direction to the insertion area located at the other end side in the first direction. Hereinafter, the insertion areas are each denoted by an ordinal number in the order in which the image insertion processing is to be executed.

When the document reading instruction is input through the operation unit 15, the image acquisition section 10B causes the image reading unit 11 to read the first document 40, and generate the first image corresponding to the first image 42. The image acquisition section 10B acquires the generated first image and stores the first image in the HDD 19.

After the first document 40 is read, the user places a second document including a second image on the contact glass of the image reading unit 11, and inputs the document reading instruction through the operation unit 15.

Figure 7:
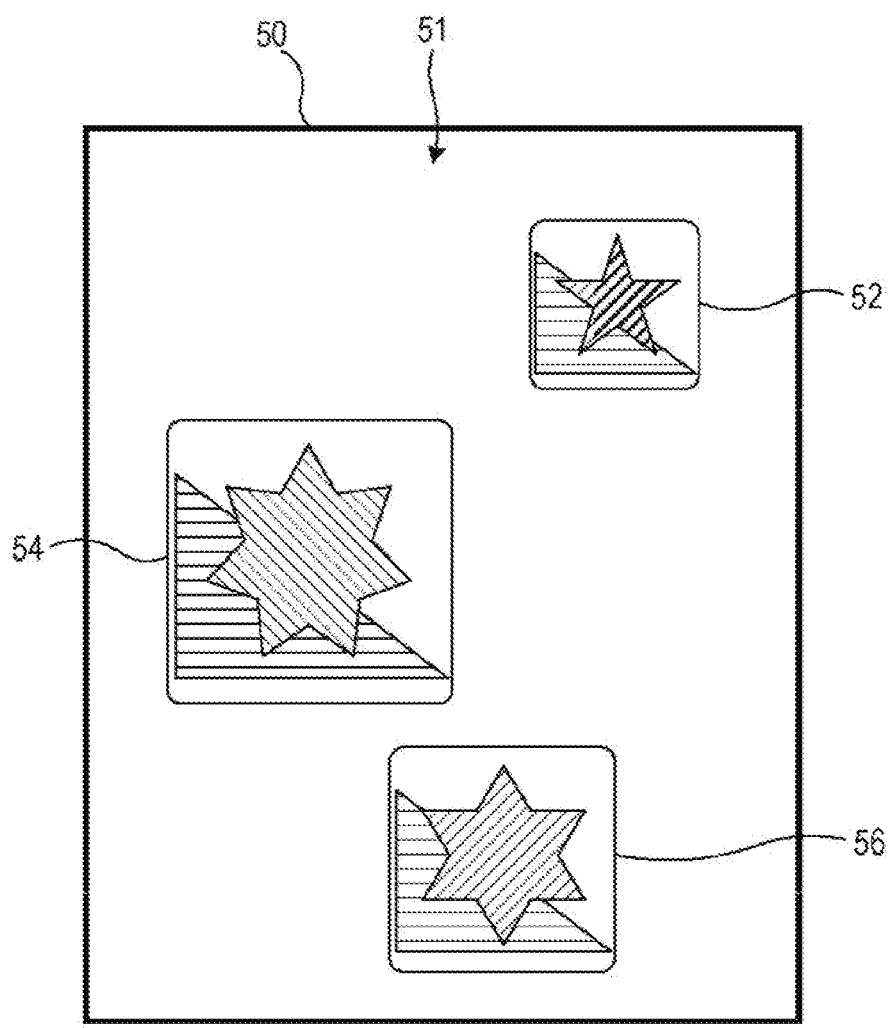
FIG. 7 illustrates an example of a second image.

FIG. 7 illustrates an example of the second image. Referring to FIG. 7, a second image 51 is image data generated based on a second document 50. The data structure of the second image 51 will be described below using the second document 50. The second image 51 includes insertion images 52, 54, and 56 to be inserted into the insertion areas 44, 46, and 48, respectively, in that order from one end side in a second predetermined direction toward the other end side in the second direction. All the insertion images 52, 54, and 56 are color images formed using yellow (Y), magenta (M), cyan (C), and black (K).

In the present embodiment, the image processing section 10E executes, as the image insertion processing, image processing on the insertion images in order from the insertion image located at one end side in the second direction toward the insertion image located at the other end side in the second direction. Hereinafter, the insertion images are each denoted by an ordinal number in the order in which the image insertion processing is to be executed.

When the document reading instruction is input through the operation unit 15, the image acquisition section 10B causes the image reading unit 11 to read the second document 50 and generate the second image corresponding to the second image 51. The image acquisition section 10B acquires the generated second image and stores the second image in the HDD 19.

As described above, the image acquisition section 10B acquires the first image 42 and the second image 51 in such a manner that the image reading unit 11 reads the first document and the second document.

After the second document 50 is read, when the user inputs an instruction to finish the use of the scanner function through the operation unit 15, the control section 10A causes the display 16 to display the home screen 30 again. The user presses the key 34 to use the image insertion function. When the key 34 is pressed, the control section 10A accepts the selection of the image insertion function, and causes the display 16 to display, for example, a message to prompt the user to select the first image and the second image.

Referring to FIG. 3, when the user who has checked the message selects the first image and second image stored in the HDD 19 by inputting an instruction through the operation unit 15, the control section 10A determines that the first image and the second image have already been acquired (YES in step S10), and the control section 10A substitutes "1" into a variable "i" and substitutes "1" into a variable "j" (step S11). The variable "i" is a value indicating the ordinal number to be denoted to each insertion area included in the first image in the order in which the image insertion processing is to be executed. The variable "j" is a value indicating the ordinal number to be denoted to each insertion image included in the second image in the order in which the image insertion processing is to be executed.

When the control section 10A performs the substitution as described above, the insertion area detection section 10C detects the insertion areas 44, 46, and 48 from the first image 42 based on the first image, and the insertion image detection section 10D detects the insertion images 52, 54, and 56 from the second image 51 based on the second image (step S12). In detecting the insertion areas, the insertion area detection section 10C detects a line that forms the boundary of the insertion area, the type of the line, the presence or absence of a line and figure included in the insertion area, and the type of the figure.

The control section 10A determines whether the number of insertion areas detected by the insertion area detection section 10C matches the number of insertion images detected by the insertion image detection section 10D (step S13). In this case, the number of the insertion areas 44, 46, and 48 is "3" and the number of the insertion images 52, 54, and 56 is "3". Accordingly, the control section 10A determines that the number of the insertion areas is equal to the number of the insertion images (YES in step S13), and then determines whether the boundary of the first insertion area is represented by a discontinuous line (step S14).

If the control section 10A determines that the number of the insertion areas does not match the number of the insertion images (NO in step S13), on the other hand, the control section 10A causes the display 16 to display an error screen (step S15).

Figure 8:
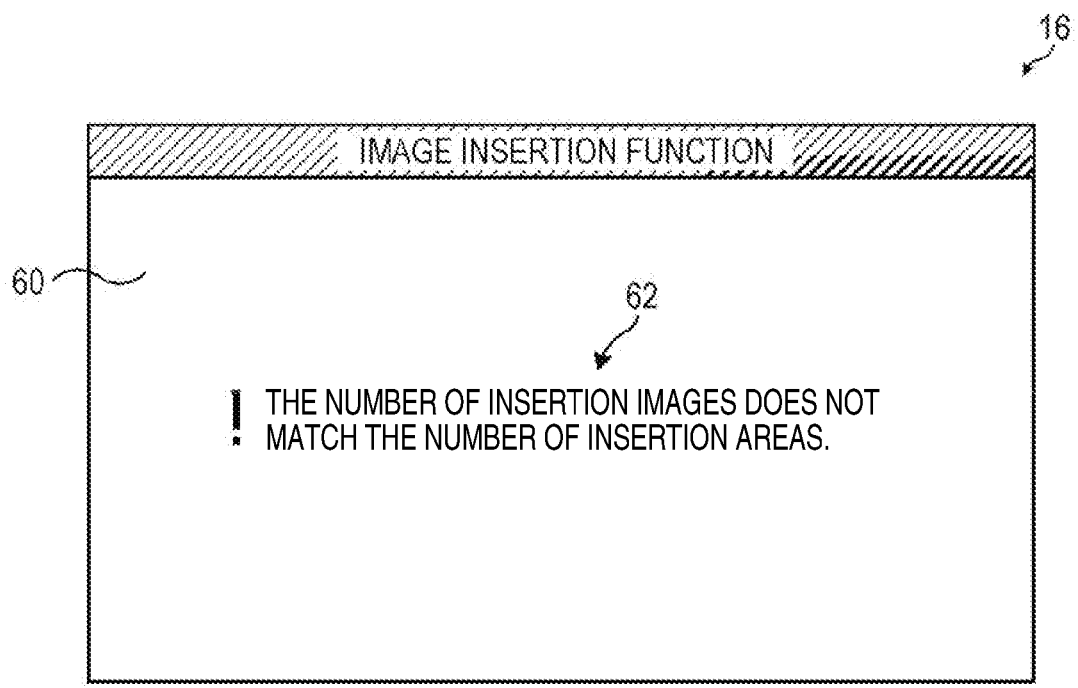
FIG. 8 illustrates an example of an error screen.

FIG. 8 illustrates an example of the error screen. Referring to FIG. 8, an error screen 60 includes a message 62 indicating a warning that "the number of insertion images does not match the number of insertion areas." After the error screen 60 is displayed, the image insertion processing ends.

(1-1) When the Boundary of the Insertion Area is Represented by a Discontinuous Line Referring to FIG. 6, in the first image 42, the boundary between the first insertion area 44 and an image portion different from the insertion area 44 is represented by a broken line 44A as a discontinuous line. The insertion area 44 does not include any figure and any line segment. Accordingly, the control section 10A determines that the boundary of the first insertion area is represented by a discontinuous line (YES in step S14), and the control section 10A also determines that the first insertion area does not include any triangular figure, any circular figure, and any diamond-shaped figure (NO in step S19, step S21, and step S24). When the above-described determination is made by the control section 10A, the image processing section 10E stores the first insertion image 52 in the HDD 19 as the first insertion image (step S26).

Specifically, the image processing section 10E stores the first insertion image 52 in the HDD 19 without executing, on the insertion image 52 detected by the insertion image detection section 10D, the processing of changing the size of the insertion image 52.

After the first insertion image is stored, the control section 10A determines whether the first image includes the next insertion area (step S27). Since the first image 42 includes the second insertion area 46, the control section 10A determines that the first image includes the next insertion area (YES in step S27), and adds "1" to the variable "i" and adds "1" to the variable "j" (step S28). As a result, the variable "i" becomes "2" and the variable "j" becomes "2".

(1-2) When the Boundary of the Insertion Area is Represented by a Solid Line (1-2-1) When the Insertion Area Includes Nothing Referring to FIG. 6, in the first image 42, the boundary between the second insertion area 46 and an image portion different from the insertion area 46 is represented by a solid line 46A as a continuous line. The insertion area 46 does not include any figure and any line segment. Accordingly, the control section 10A determines that the boundary of the second insertion area is not represented by a discontinuous line (NO in step S14), and also determines that the second insertion area does not include a line (hereinafter referred to as a "dividing line") that divides the insertion area (NO in step S16). When the above-described determination is made by the control section 10A, the image processing section 10E executes, on the second insertion image 54, processing (hereinafter referred to as "size change processing") of changing the size of the insertion image 54 in matching with the size of the insertion area 46 (step S17).

Specifically, since the insertion image 54 is larger than the insertion area 46, the image processing section 10E executes processing of reducing the size of the insertion image 54, which is detected by the insertion image detection section 10D, so that the size of the insertion image 54 matches the size of the insertion area 46.

After the size change processing is executed, the control section 10A determines that the second insertion area does not include any triangular figure, any circular figure, and any diamond-shaped figure (NO in step S19, step S21, and step S24), and stores the insertion image 54, on which the size change processing has been executed, in the HDD 19 as the second insertion image (step S26).

After the second insertion image is stored, the control section 10A executes the processing of steps S27 and S28 in a similar manner as described above. As a result, the variable "i" becomes "3" and the variable "j" becomes "3".

(1-2-2) When the Insertion Area Includes a Dividing Line

Referring to FIG. 6, in the first image 42, the boundary between the third insertion area 48 and an image portion different from the insertion area 48 is represented by a solid line 48A as a continuous line. The insertion area 48 includes a line 48B which is formed of a dashed line that divides the insertion area 48 into an area 49A and an area 49B. The insertion area 48 does not include anything other than the line 48B. Accordingly, the control section 10A determines that the boundary of the third insertion area is not represented by a discontinuous line (NO in step S14), and also determines that the third insertion area includes a dividing line (YES in step S16). When the above-described determination is made by the control section 10A, the image processing section 10E executes, on the third insertion image 56, processing (hereinafter referred to as "duplicate processing") of changing the size of the insertion image 56 in matching with the size of each of the areas 49A and 49B and inserting the insertion image 56 with the changed size into each of the area 49A and the area 49B (step S18).

Specifically, the image processing section 10E first duplicates the insertion image 56 so that the insertion image 56 detected by the insertion image detection section 10D is duplicated by the number of areas divided by the line 48B. In this case, the number of areas divided by the line 48B is two, and thus the control section 10A generates one copy of the insertion image 56.

Since the insertion image 56 is larger than the area 49A and the area 49B, the image processing section 10E executes, on the detected insertion image 56, the processing of reducing the size of the insertion image 56 so that the size of the insertion image 56 matches the size of the area 49A. The image processing section 10E further executes, on the duplicated insertion image 56, the processing of reducing the size of the insertion image 56 so that the size of the insertion image 56 matches the size of the area 49B.

The image processing section 10E generates a combined image by combining the two insertion images 56 so that the positions of the insertion images 56 subjected to the reduction processing respectively correspond to the positions of the area 49A and the area 49B. Thereafter, the duplicate processing ends.

After the duplicate processing is executed, the control section 10A determines that the third insertion area does not include any triangular figure, any circular figure, and any diamond-shaped figure (NO in step S19, step S21, and step S24), and stores the combined image obtained after the duplicate processing is executed in the HDD 19 as the third insertion image (step S26).

After the third insertion image is stored, the control section 10A determines whether the first image includes the next area (step S27). Since the first image 42 does not include a fourth insertion area, the control section 10A determines that the first image does not include the next area (NO in step S27). When the above-described determination is made by the control section 10A, the image processing section 10E generates the third image on which the insertion images 52, 54, and 56 are inserted into the insertion areas 44, 46, and 48 of the first image 42, respectively (step S29).

Specifically, the image processing section 10E generates the third image by combining the first image with the first to third insertion images stored in the HDD 19 so that the insertion images 52, 54, and 56 are inserted into the insertion areas 44, 46, and 48, respectively. After the third image is generated, the image insertion processing ends.

When the user inputs an instruction to print the image, which is obtained after the image insertion processing has been executed, through the operation unit 15, the control section 10A causes, for example, the image forming unit 12 to print the third image on recording paper.

Figure 9:
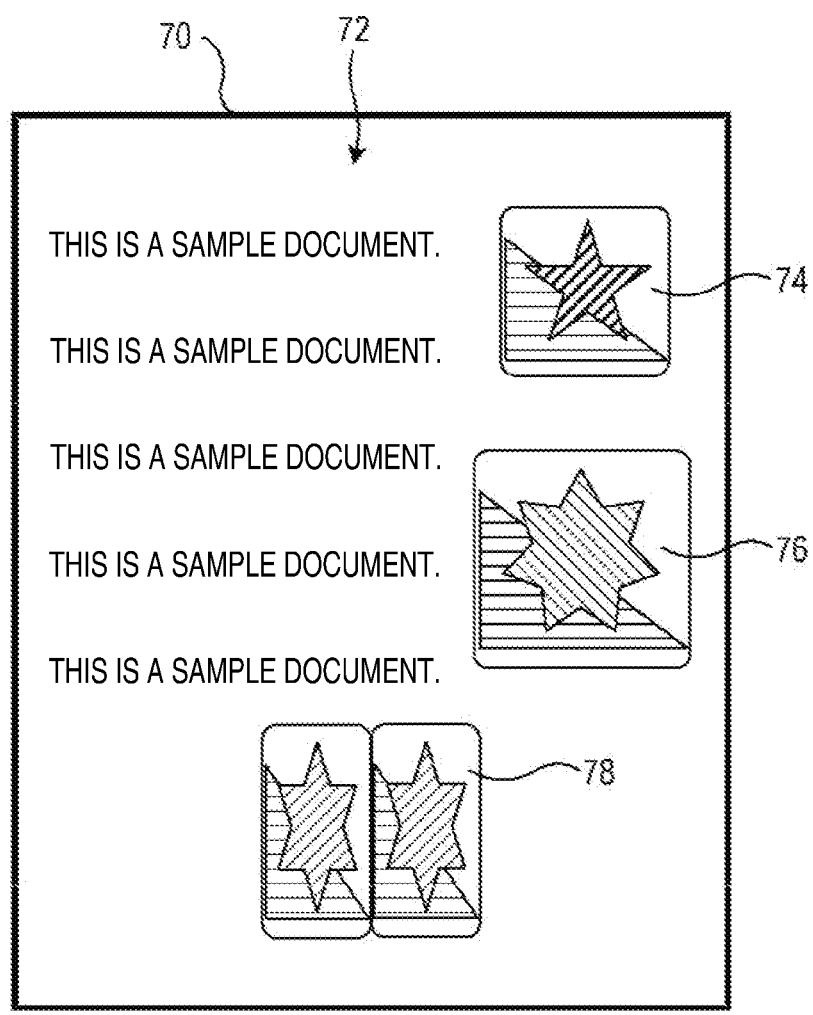
FIG. 9 illustrates an example of a third image.

FIG. 9 illustrates an example of the third image. Referring to FIG. 9, a third image 72 is printed on recording paper 70. The third image 72 includes images 74, 76, and 78 in that order. The image 74 is an image obtained by directly inserting the insertion image 52 into the insertion area 44 of the first image 42 without changing the size of the insertion image 52. The image 76 is an image obtained by inserting, into the insertion area 46 of the first image 42, the insertion image 54 whose size has been changed so as to match the size of the insertion area 46. The image 76 is an image obtained by inserting, into each of the area 49A and the area 49B of the first image 42, the insertion image 56 whose size has been changed so as to match the size of each of the area 49A and the area 49B.

(2) When the First and Second Images are Acquired Through the Communication Unit 21

First, the user creates the first image by an input operation on the operation unit of the PC 22. In creating the first image, the user conducts an input operation on the operation unit of the PC 22, thereby causing a display of the PC 22 to display a first screen based on the first image.

Figure 10:
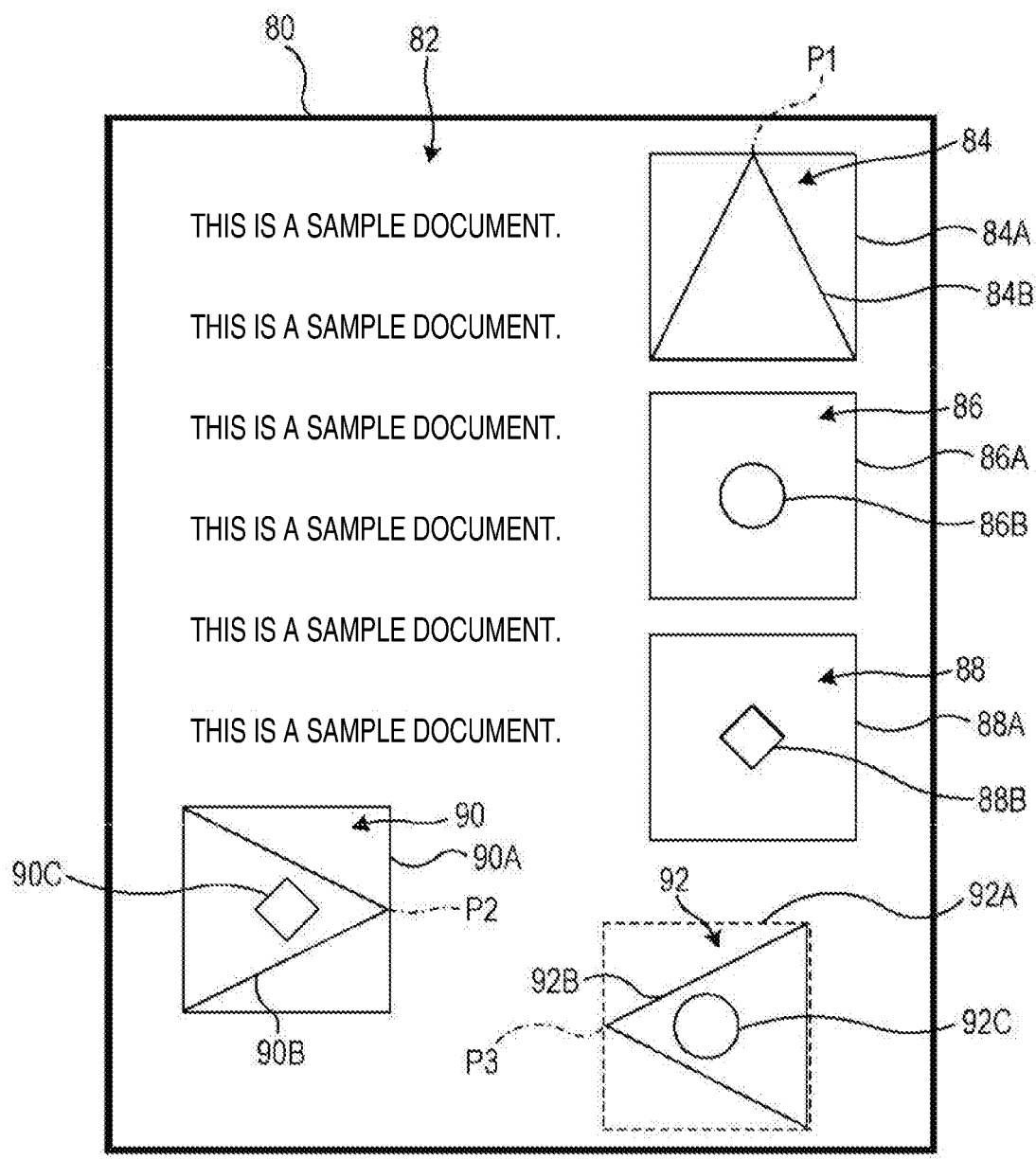
FIG. 10 illustrates another example of the first image.

FIG. 10 illustrates another example of the first image. Referring to FIG. 10, a first screen 80 is a screen to be displayed on the display based on a first image 82. The data structure of the first image 82 will be described below using the first screen 80. The first image 82 includes insertion areas 84, 86, 88, 90, and 92 in that order from one end side in a third predetermined direction toward the other end side in the third direction. The insertion areas 84, 86, 88, 90, and 92 are rectangular areas each representing a position where an image is inserted.

In the present embodiment, the image processing section 10E executes, as the image insertion processing, image processing on the insertion areas in order from the insertion area located at one end side in the third direction toward the insertion area located at the other end side in the third direction. Hereinafter, the insertion areas are each denoted by an ordinal number in the order in which the image insertion processing is executed.

After the first image is created, the user creates the second image by an input operation on the operation unit of the PC 22. In creating the second image, the user performs the input operation on the operation unit of the PC 22 to display a second screen based on the second image on the display of the PC 22.

Figure 11:
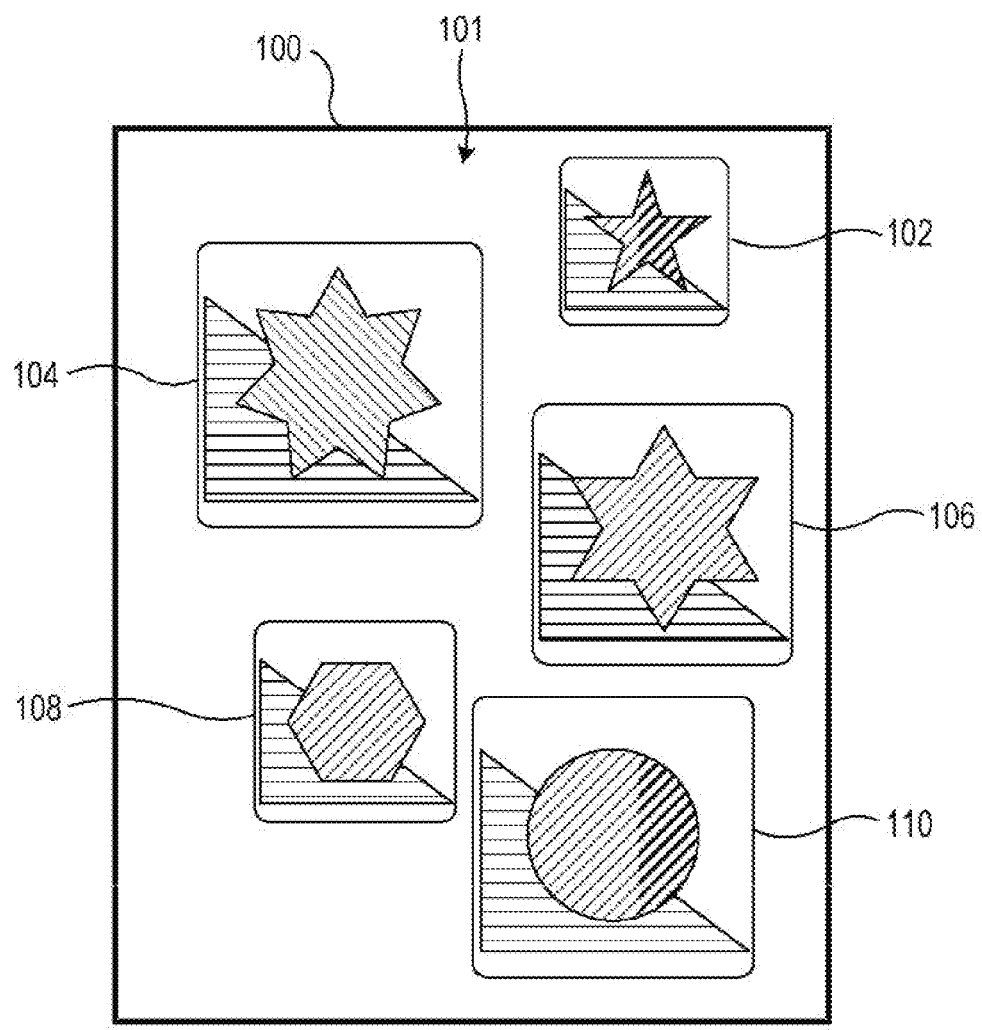
FIG. 11 illustrates another example of the second image.

FIG. 11 illustrates another example of the second image. Referring to FIG. 11, a second screen 100 is a screen to be displayed on the display based on a second image 101. The data structure of the second image 101 will be described below using the second screen 100. The second image 101 includes insertion images 102, 104, 106, 108, and 110 to be inserted into the insertion areas 84, 86, 88, 90, and 92 in that order from one end side in a fourth predetermined direction toward the other end side in the fourth direction. All the insertion images 102, 104, 106, 108, and 110 are RGB color images.

In the present embodiment, the image processing section 10E executes, as the image insertion processing, image processing on the insertion images in order from the insertion image located at one end side in the fourth direction toward the other end side in the fourth direction. Hereinafter, the insertion images are each denoted by an ordinal number in the order in which the image insertion processing is executed.

After creating the first image 82 and the second image 101, the user sends an instruction for transmitting the first image 82 and the second image 101 to the image forming apparatus 1 by the input operation on the operation unit of the PC 22. In accordance with the above-described instruction, the PC 22 transmits the first image 82 and the second image 101 to the image forming apparatus 1.

Upon receiving the first image 82 and the second image 101 through the communication unit 21, the image acquisition section 10B acquires and stores the received first image 82 and second image 101 in the HDD 19.

As described above, the image acquisition section 10B acquires the first image 82 and the second image 101 through the communication unit 21.

After the first image 82 and the second image 101 are transmitted, the user checks the home screen 30 displayed on the display 16 of the image forming apparatus 1, and presses the key 34 to use the image insertion function. When the key 34 is pressed, the control section 10A accepts the selection of the image insertion function, and causes the display 16 to display, for example, a message to prompt the user to select the first image and the second image.

Referring to FIG. 3, when the user who has checked the message selects the first image 82 and the second image 101 stored in the HDD 19 by the input operation through the operation unit 15, the control section 10A determines that the first image and the second image have already been acquired (YES in step S10), and substitutes "1" into the variable "i" and also substitutes "1" into the variable "j" (step S11).

When the control section 10A performs the substitution described above, the insertion area detection section 10C detects the insertion areas 84, 86, 88, 90, and 92 from the first image 82, and the insertion image detection section 10D detects the insertion images 102, 104, 106, 108, and 110 from the second image 101 (step S12). In detecting the insertion areas, the insertion area detection section 10C detects a line that forms the boundary of the insertion area, the type of the line, the presence or absence of a line and figure included in the insertion area, and the type of the figure.

The control section 10A determines whether the number of insertion areas detected by the insertion area detection section 10C matches the number of insertion images detected by the insertion image detection section 10D (step S13). In this case, the number of the insertion areas 84, 86, 88, 90, and 92 is "5" and the number of the insertion images 102, 104, 106, 108, and 110 is "5". Accordingly, the control section 10A determines that the number of the insertion areas is equal to the number of the insertion images (YES in step S13), and also determines whether the boundary of the first insertion area is represented by a discontinuous line (step S14).

If the control section 10A determines that the number of the insertion areas does not match the number of the insertion images (NO in step S13), the control section 10A executes the processing of step S15 in a similar manner as described above.

(2-1) When the Boundary of the Area is Represented by a Solid Line (2-1-1) When the Area Includes a Triangular Figure Referring to FIG. 10, in the first image 82, the boundary between the first insertion area 84 and an image portion different from the insertion area 84 is represented by a solid line 84A as a continuous line. The insertion area 84 includes a triangular figure 84B, and does not include any other line segments and figures. A predetermined vertex P1 of the triangular figure 84B is located on one end side in the third direction in the insertion area 84. The orientation of such a triangle is hereinafter referred to as an "upward direction".

Accordingly, the control section 10A determines that the boundary of the first insertion area is not represented by a discontinuous line (NO in step S14), and also determines that the first insertion area does not include a dividing line (NO in step S16). When the above-described determination is made by the control section 10A, the image processing section 10E executes the size change processing on the first insertion image 102 to change the size of the insertion image 102 so as to match the size of the insertion area 84 (step S17).

Specifically, since the insertion image 102 is smaller than the insertion area 84, the image processing section 10E executes processing of enlarging the size of the insertion image 102, which is detected by the insertion image detection section 10D, so that the size of the insertion image 102 matches the size of the insertion area 84.

After the size change processing is executed, the control section 10A determines that the first insertion area 84 includes a triangular figure (YES in step S19). When the above-described determination is made by the control section 10A, the image processing section 10E executes processing (hereinafter referred to as "rotation processing") on the insertion image 102 obtained after the size change processing is performed, of rotating the insertion image 102 by an amount corresponding to a predetermined angle depending on the orientation of the triangle (step S20).

In this case, the HDD 19 preliminarily stores a rotation angle corresponding to the orientation of the triangle. In the present embodiment, the HDD 19 stores "180 degrees clockwise" as the rotation angle corresponding to the "upward direction", stores "0 degrees" as the rotation angle corresponding to the "downward direction", stores "90 degrees counterclockwise" as the rotation angle corresponding to the "rightward direction", and stores "90 degrees clockwise" as the rotation angle corresponding to the "leftward direction".

In this case, since the figure 84B is an upward triangle, the image processing section 10E executes the rotation processing on the insertion image 102, which is obtained after the size change processing is executed, to rotate the insertion image 102 by 180 degrees clockwise.

After the rotation processing is executed, the control section 10A determines that the first insertion area 84 does not include any circular figure and any diamond-shaped figure (NO in step S21 and step S24), and stores the insertion image 102, which is obtained after the rotation processing is executed, in the HDD 19 as the first insertion image (step S26).

After the first insertion image is stored, the control section 10A executes the processing of steps S27 and S28 in a similar manner as described above. As a result, the variable "i" becomes "2" and the variable "j" becomes "2".

(2-1-2) When the Area Includes a Circular Figure

Referring to FIG. 10, in the first image 82, the boundary between the second insertion area 86 and an image portion different from the insertion area 86 is represented by a solid line 86A as a continuous line. The insertion area 86 includes a circular figure 86B and does not include any other line segments and figures.

Accordingly, the control section 10A determines that the boundary of the second insertion area is not represented by a discontinuous line (NO in step S14), and also determines that the second insertion area does not include a dividing line (NO in step S16). When the above-described determination is made by the control section 10A, the image processing section 10E executes the size change processing on the second insertion image 104 to change the size of the insertion image 104 so as to match the size of the insertion area 86 (step S17).

Specifically, since the insertion image 104 is larger than the insertion area 86, the image processing section 10E executes the processing of reducing the size of the insertion image 104, which is detected by the insertion image detection section 10D, so that the size of the insertion image 104 matches the size of the insertion area 86.

After the size change processing is executed, the control section 10A determines that the second insertion area does not include any triangular figure (NO in step S19), determines that the second insertion area includes a circular figure (YES in step S21), and determines whether the second insertion image 104 is a color image (step S22).

Since the insertion image 104 is an RGB color image, the control section 10A determines that the second insertion image 104 is a color image (YES in step S22). When the above-described determination is made by the control section 10A, the image processing section 10E executes, on the insertion image 104 obtained after the size change processing is executed, processing (hereinafter referred to as "monochrome conversion processing") of converting the insertion image 104 from the color image into a black-and-white image (step S23).

The method for implementing the monochrome conversion processing is not particularly limited, as long as the method is generally used in the field to which the present disclosure pertains. For example, an NTSC weighted average method, or an intermediate value method that uses an intermediate value of RGB can be used. When the second insertion image 104 is not a color image (NO in step S22), the monochrome conversion processing is not executed and the processing of step S24 is executed.

After the monochrome conversion processing is executed, the control section 10A determines that the second insertion area does not include any diamond-shaped figure (NO in step S24), and stores the insertion image 104, which is obtained after the monochrome conversion processing is executed, in the HDD 19 as the second insertion image 104 (step S26).

After the second insertion image 104 is stored, the control section 10A executes the processing of steps S27 and S28 in a similar manner as described above. As a result, the variable "i" becomes "3" and the variable "j" becomes "3".

(2-1-3) When the Area Includes a Diamond-Shaped Figure

Referring to FIG. 10, in the first image 82, the boundary between the third insertion area 88 and an image portion different from the insertion area 88 is represented by a solid line 88A as a continuous line. The insertion area 88 includes a diamond-shaped figure 88B and does not include any other line segments and figures.

Accordingly, the control section 10A determines that the boundary of the third insertion area is not represented by a discontinuous line (NO in step S14), and also determines that the third insertion area does not include a dividing line (NO in step S16). When the above-described determination is made by the control section 10A, the image processing section 10E executes the size change processing on the third insertion image 106 to change the size of the insertion image 106 so as to match the size of the insertion area 88 (step S17).

Specifically, since the insertion image 106 is larger than the insertion area 88, the image processing section 10E executes the processing of reducing the size of the insertion image 106, which is detected by the insertion image detection section 10D, so that the size of the insertion image 106 matches the size of the insertion area 86.

After the size change processing is executed, the control section 10A determines that the third insertion area does not include any triangular figure and any circular figure (NO in step S19 and step S21), and also determines that the third insertion area includes a diamond-shaped figure (YES in step S24). When the above-described determination is made by the control section 10A, the image processing section 10E executes, on the insertion image 106 obtained after the size change processing is executed, processing (hereinafter referred to as "color reversal processing") of converting the hue of the insertion image 106 into a complementary color (step S25).

The method for implementing the color reversal processing is not particularly limited, as long as the method is generally used in the field to which the present disclosure pertains. For example, a method in which correspondence relationships between RGB values indicating a predetermined hue and RGB values indicating the complementary color of the hue are stored as a look-up table can be used.

After the color reversal processing is executed, the control section 10A stores the insertion image 106, which is obtained after the color reversal processing is executed, in the HDD 19 as a third insertion image (step S26). After the third insertion image is stored, the control section 10A executes the processing of steps S27 and S28 in a similar manner as described above. As a result, the variable "i" becomes "4" and the variable "j" becomes "4".

(2-1-4) When the Area Includes a Plurality of Figures

Referring to FIG. 10, in the first image 82, the boundary between the fourth insertion area 90 and an image portion different from the insertion area 90 is represented by a solid line 90A as a continuous line. The insertion area 90 includes a triangular figure 90B and a diamond-shaped figure 90C, but does not include any other line segments and figures. A predetermined vertex P2 of the triangular figure 90B is located on one end side in a fifth direction, which is perpendicular to the third direction, in the insertion area 90. The orientation of such a triangle is hereinafter referred to as the "rightward direction".

Accordingly, the control section 10A determines that the boundary of the fourth insertion area 90 is not represented by a discontinuous line (NO in step S14), and also determines that the fourth insertion area 90 does not include a dividing line (NO in step S16). When the above-described determination is made by the control section 10A, the image processing section 10E executes the size change processing on the fourth insertion image 108 to change the size of the insertion image 108 so as to match the size of the insertion area 90 (step S17).

Specifically, since the insertion image 108 is smaller than the insertion area 90, the image processing section 10E executes processing of enlarging the size of the insertion image 108, which is detected by the insertion image detection section 10D, so that the size of the insertion image 108 matches the size of the insertion area 90.

After the size change processing is executed, the control section 10A determines that the fourth insertion area 90 includes a triangular figure (YES in step S19). When the above-described determination is made by the control section 10A, the image processing section 10E executes the rotation processing on the insertion image 108, which is obtained after the size change processing is executed, to rotate the insertion image 108 by an amount corresponding to a predetermined angle depending on the orientation of the triangle (step S20).

In this case, the figure 90B is a rightward triangle. Accordingly, the image processing section 10E executes the rotation processing on the insertion image 108, which is obtained after the size change processing is executed, to rotate the insertion image 108 by 90 degrees counterclockwise.

After the rotation processing is executed, the control section 10A determines that the fourth insertion area 90 does not include any circular figure (NO in step S21), and also determines that the fourth insertion area 90 includes a diamond-shaped figure (YES in step S24). When the above-described determination is made by the control section 10A, the image processing section 10E executes, on the insertion image 108 obtained after the rotation processing is executed, the color reversal processing of changing the hue of the insertion image 108 into a complementary color (step S25).

After the color reversal processing is executed, the control section 10A stores the insertion image 108, which is obtained after the color reversal processing is executed, in the HDD 19 as the fourth insertion image (step S26).

After the fourth insertion image is stored, the control section 10A executes the processing of steps S27 and S28 in a similar manner as described above. As a result, variable "i" becomes "5" and the variable "j" becomes "5".

(2-2) When the Boundary of the Area is Represented by a Discontinuous Line and the Area Includes a Plurality of Figures Referring to FIG. 10, in the first image 82, the boundary between the fifth insertion area 92 and an image portion different from the insertion area 92 is represented by a broken line 92A as a discontinuous line. The insertion area 92 includes a triangular figure 92B and a circular figure 92C, but does not include any other line segments and figures. A predetermined vertex P3 of the triangular figure 92B is located on the other end side in the fifth direction in the insertion area 92. The orientation of such a triangle is hereinafter referred to as the "leftward direction".

Accordingly, the control section 10A determines that the boundary of the fifth insertion area 92 is represented by a discontinuous line (YES in step S14), and also determines that the fifth insertion area 92 includes a triangular figure (YES in step S19). When the above-described determination is made by the control section 10A, the image processing section 10E executes the rotation processing on the fifth insertion image 110 to rotate the insertion image 110 by a predetermined angle depending on the orientation of the triangle (step S20).

Specifically, since the figure 92B is a leftward triangle, the image processing section 10E executes the rotation processing on the insertion image 110, which is detected by the insertion image detection section 10D, to rotate the insertion image 110 by 90 degrees clockwise.

After the rotation processing is executed, the control section 10A determines that the fifth insertion area 92 includes a circular figure (YES in step S21), and also determines whether the fifth insertion image is a color image (step S22).

Since the insertion image 110 is an RGB color image, the control section 10A determines that the fifth insertion image is a color image (YES in step S22). When the above-described determination is made by the control section 10A, the image processing section 10E executes, on the insertion image 110 obtained after the rotation processing is executed, the monochrome conversion processing of converting the insertion image 110 from the color image into the black-and-white image (step S23).

After the monochrome conversion processing is executed, the control section 10A determines that the fifth insertion area 92 does not include any diamond-shaped figure (NO in step S24), and stores the insertion image 110, which is obtained after the monochrome conversion processing is executed, in the HDD 19 as the fifth insertion image (step S26).

After the fifth insertion image is stored, the control section 10A determines whether the first image 82 includes the next area (step S27). Since the first image 82 does not include a sixth insertion area, the control section 10A determines that the first image 82 does not include the next area (NO in step S27). When the above-described determination is made by the control section 10A, the image processing section 10E generates the third image by inserting the insertion images 102, 104, 106, 108, and 110 into the insertion areas 84, 86, 88, 90, and 92, respectively, of the first image 82 (step S29).

Specifically, the control section 10A generates the third image by combining the first image with the first to fifth insertion images stored in the HDD 19 so that the insertion images 102, 104, 106, 108, and 110 are inserted into the insertion areas 84, 86, 88, 90, and 92, respectively. After the third image is generated, the image insertion processing ends.

When the user inputs an instruction to print the image, which is obtained after the image insertion processing is executed, through the operation unit 15, the control section 10A causes, for example, the image forming unit 12 to print the third image on recording paper.

Figure 12:
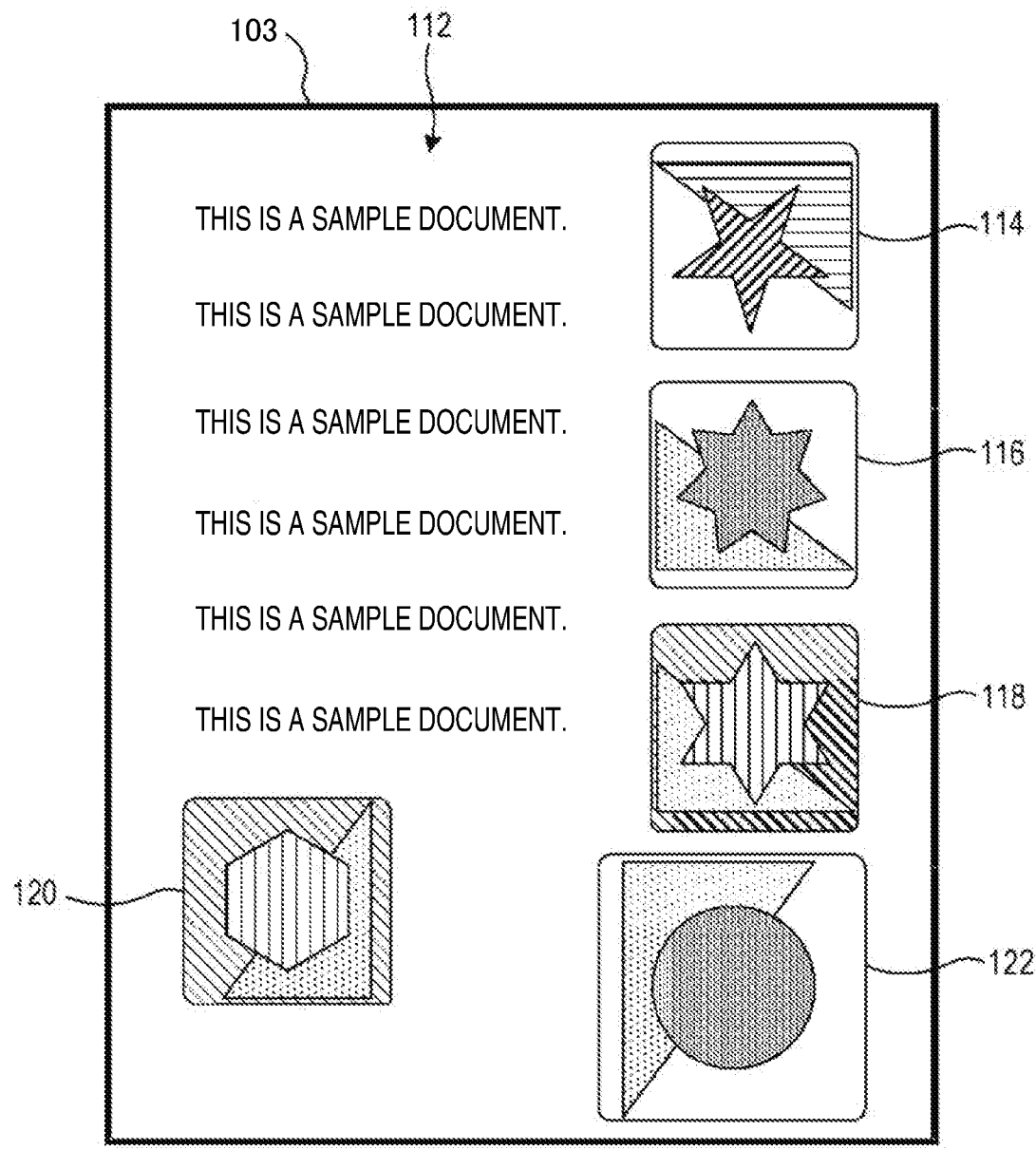
FIG. 12 illustrates another example of the third image.

FIG. 12 illustrates another example of the third image. Referring to FIG. 12, a third image 112 is printed on recording paper 103. The third image 112 includes images 114, 116, 118, 120, and 122 in that order.

The image 114 is obtained in such a manner that the insertion image 102, which is enlarged so as to match the size of the insertion area 84 and is then rotated by 180 degrees clockwise, is inserted into the insertion area 84 of the first image 82.

The image 116 is obtained in such a manner that the insertion image 104, which is reduced so as to match the size of the insertion area 86 and is then converted from the color image into the black-and-white image, is inserted into the insertion area 86 of the first image 82.

The image 118 is obtained in such a manner that the insertion image 106, which is reduced so as to match the size of the insertion area 88 and whose hue is converted into a complementary color, is inserted into the insertion area 88 of the first image 82.

The image 120 is obtained in such a manner that the insertion image 108, which is enlarged so as to match the size of the insertion area 90 and is then rotated by 90 degrees counterclockwise and whose hue is converted into a complementary color, is inserted into the insertion area 90 of the first image 82.

The image 122 is obtained in such a manner that the insertion image 110, which is rotated by 90 degrees clockwise and is then converted from the color image into the black-and-white image, is inserted into the insertion area 92 of the first image 82. In the image 122, the insertion image 110 is directly inserted into the insertion area 92 without changing the size of the insertion image 110. Accordingly, a part of the insertion image 110 is inserted into the insertion area 92.

Incidentally, in the general techniques described above, the user needs to perform a touch operation for designating an object image and a position where the object image is combined on a touch panel so as to acquire a desired combined image, which requires time and labor.

According to the embodiment described above, on the other hand, for example, the image acquisition section 10B acquires the first image 42 and the second image 51, the insertion area detection section 10C detects the insertion area 44 from the first image 42, the insertion image detection section 10D detects the insertion image 52 from the second image 51, and the image processing section 10E generates the third image 72 by inserting the detected insertion image 52 into the detected insertion area 44. Alternatively, for example, the image acquisition section 10B acquires the first image 82 and the second image 101, the insertion area detection section 10C detects the insertion area 84 from the first image 82, the insertion image detection section 10D detects the insertion image 102 from the second image 101, and the image processing section 10E generates the third image 112 by inserting the detected insertion image 102 into the detected insertion area 84.

Accordingly, the user can easily create an image in which a desired image is inserted at a desired position, without performing an input operation for instructing an image to be inserted and a position where the image is inserted.

Further, according to the embodiment described above, the insertion area detection section 10C is configured to detect a line for the insertion area and the type of the line, and the image processing section 10E is configured to insert the insertion image into the insertion area by executing predetermined image processing (hereinafter referred to as "first image processing") on the insertion image depending on the detected type of the line in the case of generating the third image.

Thus, the user can cause the image processing section 10E to execute desired image processing only by representing the boundary of each area using a predetermined line type. Consequently, time and labor for issuing an instruction for executing desired image processing through the operation unit 15 can be reduced, which leads to a further improvement in user-friendliness.

Further, according to the embodiment described above, when the line types detected by the insertion area detection section 10C are the broken lines 44A and 92A as discontinuous lines, the image processing section 10E inserts the insertion images 52 and 110 into the insertion areas 44 and 92 without executing the processing of changing the sizes of the insertion images 52 and 110.

Thus, the user can cause the image processing section 10E to skip the size change processing only by representing the boundary of each area using a discontinuous line. Consequently, time and labor for issuing an instruction to skip the size change processing through the operation unit 15 can be reduced, which leads to a further improvement in user-friendliness.

Further, according to the embodiment described above, when the line types detected by the insertion area detection section 10C are the solid lines 46A and 84A and the like as continuous lines, the image processing section 10E executes, as the first image processing, the size change processing of changing the size of the insertion images 54, 102, and the like so as to match the sizes of the insertion areas 46, 84, and the like.

Thus, the user can cause the image processing section 10E to execute the size change processing only by representing the boundary of each insertion area as a continuous line. Consequently, time and labor for issuing an instruction for executing the size change processing through the operation unit 15 can be reduced, which leads to a further improvement in user-friendliness.

Further, according to the embodiment described above, when the insertion area 48 includes the line 48B that divides the insertion area 48 into the area 49A and the area 49B, the image processing section 10E changes the size of the insertion image 56 so as to match the size of each of the area 49A and the area 49B, executes, on the insertion image 56, the duplicate processing of inserting the insertion image 56 with the changed size into each of the area 49A and the area 49B, and inserts the insertion image 56 into the insertion area 48.

Thus, the user can cause the image processing section 10E to execute the duplicate processing only by setting the area so as to include a dividing line. Consequently, time and labor for issuing an instruction to execute the duplicate processing through the operation unit 15 can be reduced, which leads to a further improvement in user-friendliness.

Further, according to the embodiment described above, in the case of generating the third image, the image processing section 10E executes predetermined image processing (hereinafter also referred to as "second image processing") on the insertion image depending on the type of the figure included in the insertion area, and generates the third image by inserting the insertion image into the insertion area.

Thus, the user can cause the image processing section 10E to execute desired image processing only by setting the insertion area so as to include a figure of a predetermined type. Consequently, time and labor for issuing an instruction for executing desired image processing through the operation unit 15 can be reduced, which leads to a further improvement in user-friendliness.

Further, according to the embodiment described above, when the insertion areas 84, 90, and 92 include the triangular figures 84B, 90B, and 92B, respectively, the image processing section 10E executes, as the second image processing, rotation processing to rotate the insertion images 102, 108, and 110 depending on the orientation of the triangle.

Thus, the user can cause the image processing section 10E to execute the rotation processing only by setting the insertion area so as to include a triangular figure. Consequently, time and labor for issuing an instruction to execute the rotation processing though the operation unit 15 can be reduced, which leads to a further improvement in user-friendliness.

Further, according to the embodiment described above, when the insertion areas 86 and 92 include the circular figures 86B and 92C, respectively, and the insertion images 104 and 110 are color images, the image processing section 10E executes, as the second image processing, the monochrome conversion processing of converting the insertion images 104 and 110 from the color images into the black-and-white images.

Thus, the user can cause the image processing section 10E to execute the monochrome conversion processing only by setting the insertion area so as to include a circular figure. Consequently, time and labor for issuing an instruction for executing the monochrome conversion processing through the operation unit 15 can be reduced, which leads to a further improvement in user-friendliness.

Further, according to the embodiment described above, when the insertion areas 88 and 90 include the diamond-shaped figures 88B and 90C, respectively, the image processing section 10E executes, as the second image processing, the color reversal processing of changing the hue of each of the insertion images 106 and 108 into a complementary color.

Thus, the user can cause the image processing section 10E to execute the color reversal processing only by setting the insertion area so as to include a diamond-shaped figure. Consequently, time and labor for issuing an instruction to execute the color reversal processing through the operation unit 15 can be reduced, which leads to a further improvement in user-friendliness.

Further, according to the embodiment described above, when the number of insertion areas detected by the insertion area detection section 10C does not match the number of insertion images detected by the insertion image detection section 10D, the control section 10A causes the display 16 to display the error screen 60 including the message 62 indicating a warning.

Thus, the user can easily recognize that the number of insertion areas does not match the number of insertion images, making it possible to easily prevent generation of an image different from a desired image.

Further, according to the embodiment described above, the image forming unit 12 forms the third images 72 and 112 on recording paper, so that the user can easily acquire a desired image.

FIRST MODIFIED EXAMPLE

The configuration of an image forming apparatus 1 including an image processing apparatus 2 according to a first modified example of the present disclosure is similar to the configuration of the image forming apparatus 1 according to the embodiment described above, except for the configuration of the error screen. The difference between the first modified example and the embodiment described above will be described below.

Figure 13:
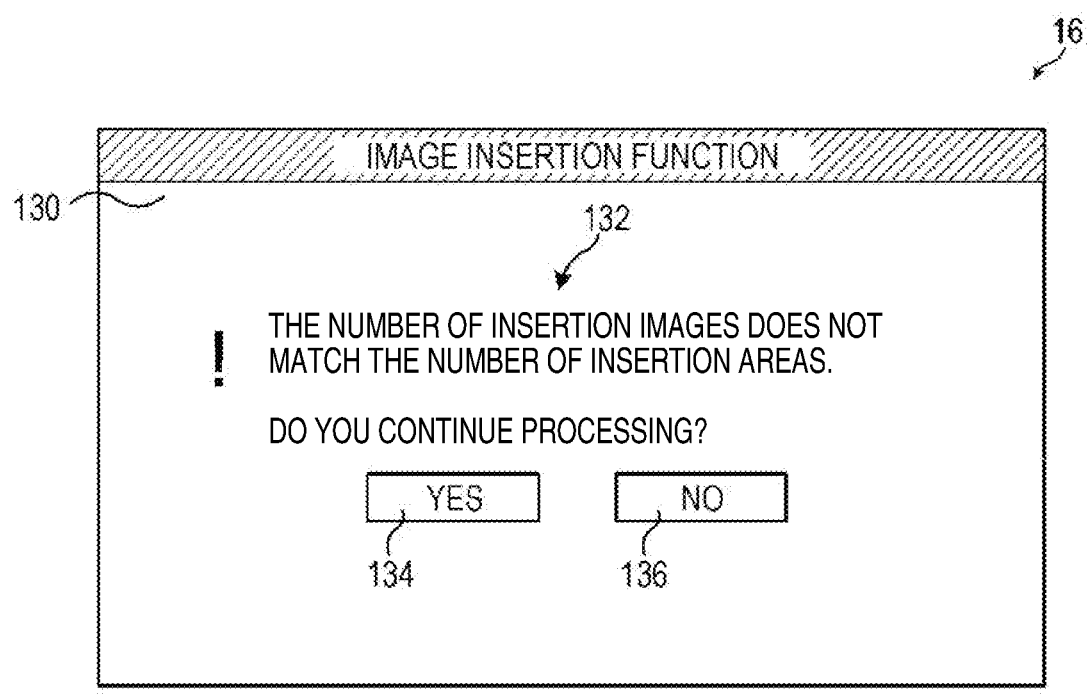
FIG. 13 illustrates another example of the error screen.

FIG. 13 illustrates another example of the error screen. Referring to FIG. 13, an error screen 130 includes a message 132 indicating a warning that "The number of insertion images does not match the number of insertion areas. Do you continue processing?". The error screen 130 also includes, as software keys, a key 134 for sending an instruction to continue the image insertion processing, and a key 136 for sending an instruction to cancel the image insertion processing.

When the user who has checked the error screen 130 presses the key 134 and the number of insertion areas included in the first image is greater than the number of insertion image, the control section 10A executes the image insertion processing in a similar manner as described above after deleting an excess number of insertion areas from the first image. The excess number of insertion areas are deleted in ascending order of the number added to each insertion area. The deletion of the insertion areas as described above may be executed not only when the key 134 is pressed, but also when the number of insertion areas does not match the number of insertion images without displaying the error screen 130.

When the user presses the key 134 and the number of insertion areas included in the first image is less than the number of insertion images, the control section 10A executes the image insertion processing in a similar manner as described above. In this case, the image insertion processing is not executed on the excess number of insertion images.

OTHER MODIFIED EXAMPLES

According to the embodiment described above, the line types include a solid line as a continuous line and a broken line as a discontinuous line. However, the present disclosure is not limited to the embodiment. The line types are not particularly limited, as long as the line types are generally used. For example, the line types may include a wavy line or double line as a continuous line, and may include a dashed-dotted line or dashed-two dotted line as a discontinuous line.

Further, according to the embodiment described above, the types of figures included in each insertion area include a triangular shape, a circular shape, and a diamond shape. However, the present disclosure is not limited to the embodiment. The types of figures are not particularly limited, as long as the types of figures are generally used. For example, the types of figures may include a hexagonal shape or elliptical shape.

Further, according to the embodiment described above, the first image processing includes size change processing, and the second image processing includes rotation processing, monochrome conversion processing, or color reversal processing. However, the present disclosure is not limited to the embodiment. The first and second image processing is not particularly limited, as long as the image processing is generally used in the field to which the present disclosure pertains. Examples of the image processing include color conversion processing, noise reduction processing, and color correction processing.

Further, according to the embodiment described above, the area 48 is divided into two areas by the line 48B. However, the present disclosure is not limited to the embodiment. For example, the area may be divided into three areas by two dividing lines. In this case, the duplicate processing is executed in such a manner that insertion images are inserted into the three divided areas, respectively.

Further, according to the embodiment described above, the image insertion processing is executed without a user instruction through the operation unit 15. However, the present disclosure is not limited to the embodiment described above. For example, the image processing apparatus 2 may be configured to include functions of executing the image insertion processing described above and executing the image insertion processing in accordance with a user instruction through the operation unit 15.

In this case, a thumbnail image corresponding to the first image and thumbnail images corresponding to all insertion images are displayed on the display 16. The user drags the thumbnail image corresponding to the desired insertion image onto a desired insertion area in the thumbnail image corresponding to the first image, making it possible to instruct an image to be inserted and a position where the image is inserted.

The present disclosure is not limited to the configurations of the embodiment described above and can be modified in various ways. For example, in the embodiment described above, a color multi-function peripheral has been described as an embodiment of the image forming apparatus according to the present disclosure. However, this is merely an example. Other image forming apparatuses, such as a monochrome multi-function peripheral or other electronic devices such as a printer, a copying machine, or a facsimile device may be used.

The configurations and processing illustrated in the embodiment described above with reference to FIGS. 1 to 13 are merely one embodiment of the present disclosure, and are not intended to limit the configurations and processing according to the present disclosure.

While the present disclosure has been described in detail with reference to the embodiments thereof, it would be apparent to those skilled in the art the various changes and modifications may be made therein within the scope defined by the appended claims.

What is claimed is:

1. An image processing apparatus comprising:
   an image input unit through which a first image including an insertion area representing a position for inserting an image and a second image different from the first image are input; and
   a control unit including a processor and configured to function, when the processor executes a control program, as:
     an image acquisition section that acquires the first image and the second image input through the image input unit;
     an insertion area detection section that detects the insertion area from the first image acquired by the image acquisition section;
     an insertion image detection section that detects, from the second image acquired by the image acquisition section, an insertion image to be inserted into the insertion area; and
     an image processing section that generates a third image by inserting the insertion image detected by the insertion image detection section into the insertion area detected by the insertion area detection section,
   wherein in the first image, a boundary between the insertion area and an image portion different from the insertion area is represented by a line,
   the insertion area detection section detects the line and a type of the line, and
   the image processing section generates the third image by executing image processing predetermined depending on the detected type of the line on the insertion image and inserting the insertion image into the insertion area,
   wherein the type of the line includes a continuous line, and
   in a case where the type of the line detected by the insertion area detection section is the continuous line, the image processing section executes, as the predetermined image processing, processing of changing a size of the insertion image in matching with a size of the insertion area.

2. The image processing apparatus according to claim 1, further comprising a display,
   wherein the control unit further functions as a control section, and
   in a case where the insertion areas detected by the insertion area detection section are not equal in number to the insertion images detected by the insertion image detection section, the control section causes the display to display a warning.

3. The image processing apparatus according to claim 2, wherein in a case where the insertion areas is greater in number than the insertion images, the control section deletes an excess number of the insertion areas from the first image.

4. The image processing apparatus according to claim 1, wherein the image input unit is an image reading unit configured to read a document and generate an image.

5. The image processing apparatus according to claim 1, wherein the image input unit is a communication unit configured to communicate with an information processing apparatus connected via a network.

6. An image forming apparatus comprising:
   the image processing apparatus according to claim 1; and
   an image forming unit configured to form the third image on a recording medium.

7. An image processing apparatus comprising:
   an image input unit through which a first image including an insertion area representing a position for inserting an image and a second image different from the first image are input; and
   a control unit including a processor and configured to function, when the processor executes a control program, as:
     an image acquisition section that acquires the first image and the second image input through the image input unit;
     an insertion area detection section that detects the insertion area from the first image acquired by the image acquisition section;
     an insertion image detection section that detects, from the second image acquired by the image acquisition section, an insertion image to be inserted into the insertion area; and
     an image processing section that generates a third image by inserting the insertion image detected by the insertion image detection section into the insertion area detected by the insertion area detection section,
   wherein the insertion area includes a figure, and
   the image processing section generates the third image by executing image processing predetermined depending on a type of the figure on the insertion image and inserting the insertion image into the insertion area,
   wherein the type of the figure includes a diamond shape, and
   in a case where the insertion area includes a diamond-shaped figure, the image processing section executes, as the predetermined image processing depending on the type of the figure, processing of changing a hue of the insertion image into a complementary color.

* * * * *